Patented Dec. 12, 1944

2,364,949

UNITED STATES PATENT OFFICE 2,364,949

CONVERSION OF HYDROCARBON OILS

Gerald C. Connolly, Baton Rouge, La., assignor to Standard Oil Development Company, a corporation of Delaware No Drawing. Application October 31, 1940, Serial No. 363,701

2 Claims. (Cl. 196—52)

This invention relates to the conversion of hydrocarbon oils and pertains more particularly to the catalytic cracking of such oils.

The object of the present invention is to use a catalyst for the cracking of hydrocarbon oils which not only has a high activity but which can withstand higher temperatures without becoming deactivated.

In an earlier filed application, Serial No. 273,887, filed May 16, 1939, I have described a catalyst for cracking hydrocarbon oils comprising zirconium oxide and silica.

I have now found that catalysts of this composition having a high order of activity and having a higher heat stability, prepared as hereinafter described, are useful in conversion of hydrocarbon oils.

In accordance with the present invention, I first impregnate the silica, preferably while in a hydrous state, with a zirconium salt solution capable of being chemically converted into zirconium oxide by treatment with a basic solution. The concentration of the zirconium salt solution should be such as to form a final product containing from 15% to 25% zirconia by weight on the dry basis and preferably about 20%. The impregnation of the silica can be accomplished by soaking the same in a solution of zirconium salt of required concentration to product a catalyst having the right concentration of zirconium oxide.

Following the impregnation the product is drained and may be either washed and then dried or dried and then washed. In either event it is essential to subject the product to a washing treatment to produce a catalyst of maximum activity for catalytic cracking.

As previously mentioned, the silica which is impregnated with the zirconium salt is preferably in the form of a hydrous oxide, such as a hydrogel or gelatinous precipitate of silica. For best results, silica hydrogel is preferred. Such a hydrogel may be prepared, for instance, according to the general procedure outlined in the Patrick Patent No. 1,297,724. When the procedure is carried out according to the disclosure in this patent, a clear silica hydrosol first forms which upon standing sets into a firm jelly containing all of the water imbibed therein.

This product is then broken into lumps and thoroughly washed to remove soluble reaction products. The washed hydrogel is then soaked in a solution containing a zirconium salt until the hydrogel is thoroughly saturated with said solution. The zirconium salt may, for example, be a nitrate, sulfate or chloride. After the silica hydrogel has been thoroughly impregnated with the zirconium salt solution, the hydrogel is allowed to drain and is then treated to convert the salt into the oxide. An ammoniacal solution is preferred for this purpose, although organic bases or other bases substantially free of the alkali metals may be used.

The resulting reaction mixture may then be washed and dried or dried and then washed. The drying operation is preferably carried out at relatively low temperature, such as below 212° F., until the bulk of the water has been removed from the silica hydrogel. Afterwards the product may be activated by slowly heating to a temperature of 800° F. or above and maintaining said temperature for an extended period, such as from 3 to 4 hours or more.

The resulting product may be used in granular, molded, or powdered form.

The results obtained by the present invention are illustrated in the following examples. It will be understood, however, that the values and conditions given in the examples are illustrative rather than limitive.

In each of the examples given the activity of the catalyst for cracking oils was determined by passing an East Texas gas oil of 33.8° A. P. I. gravity in contact with the catalyst to be tested at a temperature of 850° F. at a rate of .6 volume of liquid oil per volume of catalyst per hour and the average conversion into gasoline was determined over a two-hour period.

Example 1

A catalyst comprising silica and zirconia was prepared by soaking a hydrogel of silica, the dry gel of which had an apparent density of .60 with a zirconium nitrate solution of a concentration such that the resulting dried product contained about 15% zirconium oxide. The impregnated product was then drained, slowly dried and thereafter activated at a temperature of 800° F. for a three-hour period to decompose the nitrate to the oxide. The resulting product when tested under the conditions previously described resulted in 33% conversion.

Example 2

A silica hydrogel as described in Example 1 was impregnated with a zirconium nitrate solution of a concentration such as to form a catalyst containing about 20% of zirconium oxide. The impregnated product was then treated with an ammoniacal solution to convert the zirconium nitrate into the oxide. This product was then dried. The dried product when tested under the above conditions resulted in a conversion of about 33% gasoline.

Example 3

The catalyst was prepared as in Example 2, except that following the treatment with ammoniacal solution the product was thoroughly washed before the drying operation. This product when tested under the conditions mentioned resulted in a conversion of 51.0% gasoline.

Example 4

A catalyst was prepared as in Example 2, except that following the drying treatment the catalyst was washed before being tested. This product resulted in the production of about 46.5% gasoline under test conditions.

The catalysts prepared according to the above description are not only extremely active for cracking hydrocarbon oils as shown above but are also capable of being regenerated at high temperatures without impairing the activity thereof.

I claim:

1. A method of cracking hydrocarbon oils which comprises passing the oil in vapor form through a cracking zone containing a catalyst consisting essentially of silica and zirconia prepared by first forming a silica hydrosol, thereafter causing said hydrosol to coagulate into a hydrogel, removing reaction impurities from the hydrogel so formed, impregnating the washed silica hydrogel with a zirconium salt solution to form a dried product containing from 15% to 25% of zirconium oxide, thereafter converting the zirconium salt into the oxide, washing and drying the resulting product to form the catalyst, and maintaining the oil vapors within the cracking zone in contact with said catalyst for a period sufficient to convert a substantial portion thereof into motor fuel constituents.

2. In the process defined by claim 1 wherein the zirconium salt is treated with an ammoniacal solution to convert the salt into the oxide.

GERALD C. CONNOLLY.